UNITED STATES PATENT OFFICE.

BENJAMIN CORY PETTINGELL, OF VICTORIA, CANADA, ASSIGNOR TO JOANNA PETTINGELL, OF SAME PLACE.

BLASTING-POWDER.

SPECIFICATION forming part of Letters Patent No. 546,552, dated September 17, 1895.

Application filed November 9, 1894. Serial No. 528,332. (No specimens.)

*To all whom it may concern:*

Be it known that I, BENJAMIN CORY PETTINGELL, of Victoria, Province of British Columbia, and Dominion of Canada, have invented new and useful Improvements in Explosive Powders and in the Process of Making the Same, of which the following is a full, clear, and exact description.

This invention has for its object the production of a powder for blasting, as in coal mining and for other explosive purposes, which shall possess great strength, be cheap, and shall emit no flame when exploded.

The ingredients of which my improved powder is or may be composed are dissolved niter, sulfur, coal or coke dust, and wood pulp, in or about the proportions hereinafter stated. Thus, I take for instance, say, sixty pounds of niter and dissolve the same in water, then add about twenty pounds of fine coal or coke dust and mix thoroughly. After this I evaporate the water contained in said mixture and when the latter is dry add about sixteen pounds of sulfur and four pounds of wood pulp and thoroughly mix the whole together. The powder is then ready for use. This powder makes less than half the smoke of any other black powder in common use and it readily explodes with a spark. Other ingredients, such as usual in the manufacture of other explosives, may or may not be mixed or used in connection with the wood pulp, niter, and sulfur.

In defining my invention with greater clearness I would state that there are in my invention two important features of distinction. One is in the use of the mineral carbon—such as coal-dust or coke-dust, instead of charcoal—and the other is in the method of mixing the ingredients, which consists in immersing the coal-dust singly and alone in an aqueous solution of niter and then evaporating the water before adding the sulfur and wood pulp. Now, I am aware that an aqueous solution of niter has been added to a mixture of carbon and sulfur, the carbon particles being first coated with a solution of sulfur, and that an aqueous solution of niter has been added to a mixture of sawdust and sulfur before the addition of charcoal; but these processes do not reach the result attained by me for the following reasons: In the chemical reaction which takes place between the ingredients of carbon, sulfur, and niter, it will be remembered that both carbon and sulfur are reducing-agents, while the niter is the oxidizing-agent, which supplies the elements necessary to combine with the carbon and sulfur to give the great gas-volume in the explosion. Of these two reducing-agents the carbon is much more electropositive of the two and unites much more vigorously with the liberated oxygen; and hence it is necessary for rapidity of action and thoroughness of effect that the niter should be very intimately incorporated with the carbon, and this my process does by having the carbon alone and in the form of minute particles first immersed in a solution of niter and then dried, so as to leave each minute carbon particle coated with an envelope of niter, giving the closest possible association between the active oxidizing-agent and the more active reducing-agent. Where a mixture of carbon and sulfur (the carbon being coated with a solution of sulfur) is treated with a solution of niter it is obvious that each particle of carbon cannot be so intimately reached by the niter on account of the intermediate coating of sulfur, and where a mixture of sulfur and sawdust is subjected to this solution of niter the sawdust takes up the largest part of the niter, and as the carbon is only added afterward in an imperfect mechanical way and is not intimately associated with the niter, as it would be if immersed singly in the solution and first subjected to its absorption, we have therefore in either case the sulfur, the least electropositive ingredient, directly in contact with the niter, and the carbon, the more electropositive ingredient, only imperfectly mixed with the niter, resulting in a corresponding diminution of efficiency in the product.

By immersing the carbon particles first and singly in the solution of niter before adding the other ingredients the niter and carbon are brought into such intimate relations as to enable me to use the cheaper form of mineral carbon, which also involves less danger from premature explosion. The mineral coal-dust has also a percentage of ammonia uniformly found associated with it, and this ammonia n my process becomes nitrated, and is thus converted into a most energetic explosive, greatly adding to the efficiency of my compound. Furthermore, by my process the reation of the three main ingredients—carbon, niter, and sulfur—is so arranged that the niter n the ultimate particles comes between the carbon and sulfur, which is its proper relation for greatest efficiency.

The addition of the wood-pulp in my compound is mainly to secure porosity and rapid combustion, but it also acts as a binder. My compound it will be seen needs the wood-pulp to supplement its porosity on account of the solid coal-dust or mineral carbon, which is not so porous as charcoal.

The advantages of my compound are as follows: First, a greatly diminished cost of production; second, its greater strength and effectiveness as an explosive-agent; third, a greatly-lessened danger to the lives and the health of those engaged in its manufacture; fourth, a greatly-lessened danger in mining operations from its use therein, as its explosion is not attended by any flame, produces little, if any, smoke, and the explosive and dangerous gases so common in mining operations cannot be ignited by it, while its ordinary handling is attended by much less danger.

Having thus described my invention, I claim as new and desire to secure by Letters Patent—

1. The process of manufacturing explosive powder, which consists in first immersing the powdered carbon singly and alone in a solution of niter, then drying the same, and afterward adding and mixing mechanically therewith the other ingredients substantially as and for the purpose described.

2. The process of manufacturing explosive powder which consists in first immersing pulverized mineral carbon singly and alone in an aqueous solution of niter, and then adding and mixing mechanically therewith sulfur and wood pulp, substantially as and for the purpose described.

BENJAMIN CORY PETTINGELL. [L. S.]

Witnesses:
WILLIAM MERRIMAN,
JOHN WILSON.